United States Patent Office 3,532,774
Patented Oct. 6, 1970

3,532,774
PHOSPHINITES, PHOSPHINE OXIDES AND
PROCESS FOR PREPARING
Ludwig Maier, Zurich, Switzerland, assignor to Monsanto Company, St. Louis, Mo., a corporation of Delaware
No Drawing. Continuation-in-part of application Ser. No. 515,720, Dec. 22, 1965. This application Sept. 29, 1966, Ser. No. 583,079
Int. Cl. C07f 9/28, 9/50
U.S. Cl. 260—928      16 Claims

ABSTRACT OF THE DISCLOSURE

Phosphinites and phosphine oxides of the formulas $R^1R^2POR^3$, $R^1R^2R^3PO$, $R^1R^2P$—O—$R^6$—O—$PR^1R^2$ and $R^1R^2P(O)$—$R^6$—$P(O)R^1R^2$ and process for making by heating an amino-phosphine of formula $R^1R^2PNR^4R^5$ with a hydroxyl compound of formula $R^3OH$ or HO—$R^6$—OH to split off ammonia or amine and form phosphinite and isomerizing to phosphine oxide in presence of isomerization catalyst.

---

This application is a continuation-in-part of copending application Ser. No. 515,720, filed Dec. 22, 1965, and now abandoned.

Phosphinites and phosphine oxides of the formulas:

(1)                      $R^1R^2POR^3$ (2)                      $R^1R^2R^3PO$ (3)         $R^1R^2P$—O—$R^6$—O—$PR^1$—$R^2$ and (4)           $R^1R^2P$—$R^6$—$PR^1R^2$
                      ‖      ‖
                      O      O wherein $R^1$, $R^2$ and R are identical or different hydrocarbon groups and $R^6$ is a hydrocarbylene group can be prepared according to various well-known processes.

According to one of these processes a dialkylchlorophosphate is reacted with a Grignard compound. An excess amount of the Grignard compound has to be used in this reaction in order to avoid the phosphonates, or phosphinates respectively, or the corresponding acids formed in a side reaction as undesired by-products. There can be prepared only symmetrically substituted phosphine oxides by this process. Under forcing conditions (ether-benzene solution mixture) there can also be used a diphenyl-phenyl-phosphonate instead of the halophosphates mentioned. However, by the possible reaction with alkyl Grignard compounds also in this case are obtained only phosphine oxides having at least 1 to 2 aryl groups and moreover, the yields are not specially good.

According to a further process, e.g. trimethylphosphite is brought to reaction with a phenyl Grignard compound. The yields scarcely exceed 50%. Despite the limitation to aromatic derivatives which are not desired here, the formation of tertiary phosphine oxides by condensation of phosphites with Grignard compounds needs the oxidation of the trivalent phosphorus compounds as an additional reaction step. Phosphonic acids and phosphinic acids occur as undesired by-products. As a rule, symmetric phosphine oxides are formed also when a phosphoryl halide is used as a starting material. The phosphonic dihalides and phosphinic halides are relatively difficulty accessible starting products and again need a great excess of Grignard compound. Whereas, for example, from phenyldichlorophosphine oxide and p-tolylmagnesium bromide the corresponding di-(p-tolyl)-phenylphosphine oxide is obtainable, the diallyl-phenyl-phosphine oxide cannot be prepared in this manner.

In a further well-known process a phosphonic acid dihalide (e.g. $RP(O)Cl_2$) is converted into an amino-phosphonic acid halide (e.g. $RP(O)N(CH_3)_2Cl$), the remaining halogen atom is exchanged for a hydrocarbon group by means of a Grignard agent, the resulting amino-phosphine oxide (e.g. $RR'P(O)N(CH_3)_2$) is converted by acid hydrolysis into the phosphinic acid (e.g. $RR'P(O)OH$)

and this is converted by a halogenating agent (e.g. $SOCl_2$) into its halide, whereupon by a further exchange of the halogen atom by means of a Grignard agent the corresponding tertiary phosphine oxide is obtained. This multistep process comprising several reaction steps has no technical importance.

Phosphate esters, phosphonate esters and phosphinate esters, as well as phosphoryl halide and substituted phosphoryl halides can be converted in similar manner into the tertiary phosphine oxides using organolithium compounds which are known to be difficult to handle.

Still a further well-known process consists in the decomposition of quaternary phosphonium compounds in basic solutions. This process offers limited possibilities only, because always the most electronegative substituent is split off.

Other well-known processes, such as the oxidation of tertiary phosphines, the isomerization of phosphinites, the hydrolysis of tertiary phosphine dihalides, the reaction of diazoalkanes with possibly substituted phosphoryl halides, the addition of secondary phosphine oxides to aldehydes, ketones or activated olefins are mentioned for completion only. These are not or very appropriate for the preparation of the following tertiary phosphine oxides having a very specific structure.

Some of the diphosphine dioxide compounds have also been known hitherto. They have principally been prepared by reacting the hereafter cited reaction components: $R_2PX$ and M—R—M, with subsequent oxidation; $R_2PM$ and X—R—X, with subsequent oxidation; $R_2PX$ and XMg—R—MgX with subsequent oxidation;

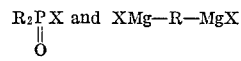

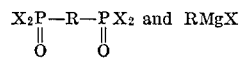

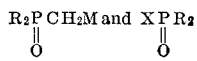

$(RO)_2P(O)H$ and RMgX and X—R—X; thereby R represents in these formulae an organic group, X a halogen atom and M an alkali metal atom.

As it is evident, all these processes need a metalorganic compound.

The present invention relates to a process for preparing phosphinites and phosphine oxides and to certain new phosphine oxides described by Formulas 1, 2, 3 and 4 above. $R^1$ and $R^2$ can be saturated or unsaturated hydrocarbyl groups having up to 24 carbon atoms, and for detergent use are preferably aliphatic having not more than 6 carbon atoms. For detergent use $R^1$ and $R^2$ of the phosphine oxides of Formula 2 above preferably have not more than 4 carbon atoms and are straight-chain and $R^3$ is preferably straight-chain aliphatic hydrocarbon having from 8 to 24 carbon atoms. For detergent one of the $R^1$, $R^2$ or $R^6$ groups of the Formula 4 phosphine oxides is aliphatic and has 8 to 24 carbon atoms and the other R groups have not more than 6 carbon atoms. If an aliphatic R group is unsaturated, it is preferred that it be olefinic unsaturation; however, acetylenic unsaturation can be present.

These aliphatic tertiary phosphine oxides are surface- and interface-active compounds which possess a certain solubility in water or which are easily dispersible by usual dispersion agents. It has been found that the solubility, or dispersibility respectively, is improved when at least one aliphatic group shows an olefinic bond.

It has been found that the tertiary phosphine oxides mentioned can be obtained in a simple manner and with good yields by heating an aminophosphine of the general formula:

$$R^1R^2PNR^4R^5$$

wherein $R^1$ and $R^2$ are defined as above and $NR^4R^5$ represents an amino group which is derived from ammonia, a primary or secondary amine, preferably with at least an equimolar amount of an alcohol of the general formula:

$$R^3OH$$

wherein $R^3$ is defined as above, in the presence of an isomerization catalyst. The reaction of invention proceeds according to the following scheme:

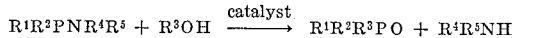

$$R^1R^2PNR^4R^5 + R^3OH \xrightarrow{\text{catalyst}} R^1R^2R^3PO + R^4R^5NH$$

In the absence of the catalyst, the phosphinite $R^1R^2POR^3$ is formed and the catalyst can then be added to cause isomerization to the phosphine oxide.

With the diols the reaction of invention proceeds according to the following scheme:

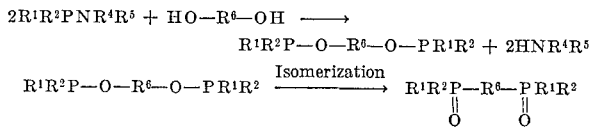

$$2R^1R^2PNR^4R^5 + HO-R^6-OH \longrightarrow$$
$$R^1R^2P-O-R^6-O-PR^1R^2 + 2HNR^4R^5$$
$$R^1R^2P-O-R^6-O-PR^1R^2 \xrightarrow{\text{Isomerization}} \underset{\underset{O}{\|}}{R^1R^2P}-R^6-\underset{\underset{O}{\|}}{PR^1R^2}$$

Like the reactions with the alcohol the catalyst can be present from the beginning to cause the phosphinite to isomerize as it is formed or can be added after all the phosphinite is formed to cause isomerization to the phosphine oxide.

The aminophosphines serving as starting products are well-known. They can be prepared particularly expediently according to patent application Ser. No. 371,735, filed June 1, 1964, of the same inventor and the same applicant.

Examples of $R^1$ and $R^2$ are methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms such as undecenyl, dodecyl, myristyl, oleyl, tetracosyl; moreover cycloalkyls, cycloalkenyls and cycloalkynyls such as cyclopentyl, cyclopentenyl, cyclopentadienyl, cyclohexyl, cyclohexenyl, cyclohexadienyl, cyclohexynyl and greater alicyclic groups having up to 12 carbon atoms such as cyclooctyl, cyclododecyl, cyclooctatrienyl, cyclododecatrienyl, bicyclohexyl; moreover aralkyls, aralkenyls and aralkynyls such as benzyl, cuminyl, phenylethyl, styryl, phenylethynyl, phenylpropyl, 3-phenylallyl, 2-phenylallyl, cinnamyl, 1-phenylpropynyl, diphenylmethyl, triphenylmethyl, alpha-naphthylmethyl, beta-naphthylmethyl, alpha-naphthylethyl, beta-naphthylethyl, alpha-naphthylethenyl, beta-naphthylethenyl, alpha-naphthylethynyl, beta-naphthylethynyl; moreover alkaryls, alkenylaryls and alkynlaryls such as tolyl, xylyl, mesityl, duryl, ethylphenyl, cumyl, vinylphenyl, ethynylphenyl, propargylphenyl, propynylphenyl, tert-butylphenyl, 1-vinylnaphthyl, 2-vinylnaphthyl, 1-ethynylnaphthyl, 2-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl etc.

It has been found that the enumerated hydrocarbon groups can also show substituents and that these substituents do not hinder the reaction. Examples of possible substituents are: Cl, Br, I, F, —OR, —SR, —COR, —CSR, —COOR, —OCOR, —CONR$_2$, —NR$_2$, —CN, —NO$_2$, —SOR, —SO$_2$R, —SO$_2$OR, —SO$_2$NR$_2$ and =NR.

Examples of the amino group $NR^4R^5$ are: NH$_2$, methylamino, dimethylamino, ethylamino, diethylamino, anilino, N-methylanilino etc. In general, it is preferred that $R^4$ and $R^5$ each have not more than 8 carbon atoms and normally alkyl is preferred; however, it is obvious from Example 2 that either $R^4$ or $R^5$ can be phenyl. As is apparent from the reaction scheme, the amino group is split off in the course of reaction in the form of ammonia or amine. When the evolving amine possesses a lower boiling point than the alcohol to be reacted, which is always the case with lower aliphatic amines or ammonia, the course of reaction can be observed by determining the amount of ammonia or amine recovered. In general, the choice of the amino group $NR^4R^5$ is directed by these aspects and also by the possibility of the recovery and re-use.

As a further reactant there is used a higher aliphatic alcohol which preferably does not show branchings. Examples are octyl alcohol, nonyl alcohol, decyl alcohol, undecyl alcohol, lauryl alcohol, tridecyl alcohol, myristyl alcohol etc. and higher alcohols having up to 24 carbon atoms in the molecule. Branched alcohols, such as iso-octyl alcohol, 2-ethyl-1-hexanol etc. or unsaturated alcohols, such as oleyl alcohol, 1-undecenyl alcohol etc. are also included.

When, as an example, diethylphosphinous dimethylamide is brought to reaction with ethyl alcohol in the same manner, no reaction occurs even at 150° C. Consequently, also the reaction of invention has certain limits, these however lie surprisingly in the desired direction.

Diols, whose hydroxyl groups are attached each to a primary or secondary aliphatic carbon atoms, are taken into consideration as second reaction components. Examples are 1,2-dihydroxyethane, 1,3-dihydroxypropane, 1,2-dihydroxypropane, 1,4-dihydroxybutane, 1,3-dihydroxybutane, 1,2-dihydroxybutane and so on to diols having about 24 carbon atoms in the chain such as ω-dihydroxytetracosane, 1,20-dihydroxy-4,8,13,17-tetramethyleicosane; moreover, cycloaliphatic diols such as 1,2-dihydroxycyclopentane, 1,2- or 1,3-dihydroxycyclohexane, 1,1'-dihydroxydicyclohexyl, 1,1'-dihydroxydicycloheptyl, 1,4-, 2,3- or 4,8-dihydroxyhexalin; moreover, mixed aliphatic-cycloaliphatic and aliphatic-aromatic diols such as 1,2-dihydroxy-1-cyclopropylethane, 1,1-dihydroxymethylcyclobutane, 1,1-dihydroxymethylcyclohexane, 1,4-di-β-hydroxyethylbenzene, 1,4-di-α-hydroxyisopropylbenzene, 2,2'-dihydroxymethyldiphenyl.

An organic halide, preferably a chloride or bromide, although iodides are also operable, such as octyl chloride, dodecyl chloride, stearyl chloride, stearyl iodide, stearyl bromide, etc. is preferably used as a catalyst. One uses preferably an organic halide of the formula $R^3Br$ derived from the alcohol being reacted; likewise, the preferred catalysts where diol reactants are involved, is Br—R$_6$—Br derived from the diol being reacted. In general, an amount of 0.001 to 0.1 mole percent based on the aminophosphine reactant is sufficient, i.e. a catalytic amount. Also, a greater amount can be used if necessary.

In practicing the invention it is sufficient to heat at about 100 to 200° C. for about ½ hour about equimolar amounts of a dialkylphosphinous amide and the alcohol or diol. But the reaction also proceeds at lower temperature, although at a lower speed. A temperature at least sufficient to split off amine from the amide reactant is necessary; however, obviously the reactants and product must not be heated to such a high temperature that substantial decomposition of either occurs. Furthermore, it is also possible to apply higher temperatures than 200° C. up to 250° C. or higher, because of the relatively high temperature resistance of the tertiary phosphine oxides. If the isomerization catalyst is present, the phosphine oxide is formed and if not the phosphinite, which can then be further heated with the isomerization catalyst to form the phosphine oxide. The amine split off is removed most easily by distilling it off from the reaction mixture. It is a considerable advantage of the novel process when the isomerization catalyst is present that trivalent phosphorus compounds being very susceptible to oxidation are not formed in significant amounts and thus, the yields of tertiary phosphine oxides are practically quantitative. If desired, the reaction can be blanketed by an inert gas such as nitrogen, argon and the like.

The tertiary phosphine oxides obtained according to the present invention can be used as additives to oils, lubricants, detergents and as surface active agents. They possess also biocidal properties and may be utilized e.g. as herbicides, insecticides, fungicides and bactericides. Moreover they form with metals and metal salts, especially with transition metal salts, soluble complex compounds and may be utilized e.g. for the extraction of uranium salts.

Ditertiary diphosphine dioxides which contain greater alkyl groups than butyl on each phosphorus atom or greater alkylene groups than hexamethylene between the two phosphorus atoms, have not been known hitherto. It has been found that such new compounds are especially suitable as washing agents or additives for washing agents, because they are surface-active and display simultaneously bactericidal properties.

EXAMPLE 1

A mixture consisting of 6 g. (0.045 mole) of $(C_2H_5)_2PN(CH_3)_2$, 8.5 g. (0.045 mole) dodecyl alcohol and 1 drop of dodecyl bromide is heated at 130–160° C. for 1½ hours. The mixture foams and the theoretical amount of dimethyl amine distills off. After cooling, the mixture crystallizes completely; M.P. 45–47° C.

The diethyl-dodecylphosphine oxide can be purified by distillation. Yield 12.3 g. (99.4%); B.P. 151–154° C./0.01 mm., M.P. 47–48° C. It is very soluble in all organic solvents and is hygroscopic.

*Analysis.*—Calc'd for $C_{16}H_{35}OP$ (percent): C, 70.02; H, 12.86. Found (percent): C, 69.82; H, 13.24.

$31_P$ chemical shift (in methanol) −56.1 p.p.m.

EXAMPLE 2

A mixture consisting of 8.3 g. (0.05 mole) of $(CH_3)_2PN(CH_3)(C_6H_5)$, 9.3 g. (0.05 mole) of dodecyl alcohol and 1 drop of dodecyl bromide is heated at 170–200° C. for 1½ hours and the methylaniline which is split off is distilled in vacuo. After cooling, the mixture crystallizes completely. The dimethyl-dodecylphosphine oxide can be purified by crystallization in light petroleum. Yield 12.0 g. (98%); M.P. 80–82° C. $31_P$ chemical shift (in benzene) −39.0 p.p.m.

EXAMPLE 3

In similar manner as Examples 1 and 2 there is obtained with $(CH_3)_2PN(C_2H_5)_2$, tetradecyl alcohol and some tetradecyl bromide the dimethyl-tetradecyl phosphine oxide.

Yield 100% (crude product). The purification is achieved by recrystallization in light petroleum; M.P. 84–86° C., $31_P$ chemical shift −37.2 p.p.m.

*Analysis.*—Calc'd for $C_{16}H_{35}OP$ (percent): C, 70.02; H, 12.86. Found (percent): C, 69.62; H, 12.03.

EXAMPLE 4

A mixture consisting of 21.7 g. (0.1 mole) of $(n-C_4H_9)_2PN(C_2H_5)_2$ and 17.0 g. (0.1 mole) of 10-undecene-1-ol is stirred in a nitrogen atmosphere at 140° C. for 1 hour. 6.8 g. (94.5%) diethylamine distill off. One drop of dodecylbromide is added to the clear colorless oil and it is heated at 150° C. for 1½ hours. The subsequent distillation yields 25.8 g. (82.3%) 10-undecen-1-yl-dibutyl phosphine oxide; B.P. 115–118° C./0.5 mm. The clear colorless oil can be also distilled at normal pressure at 240° C.

EXAMPLE 5

A mixture of 11.46 g. (0.005 mole) of $$(C_6H_5)_2PN(CH_3)_2$$

and 1.55 g. (0.0025 mole) $HOCH_2CH_2OH$ is heated at 140° C. for 5 hours in a nitrogen atmosphere. There are evolved 2.2 g. (97.6%) of dimethylamine. The reaction mixture is distilled. Besides a small forerun and a residue of 1.8 g. one obtains 7.9 g. (73.6%) of $(C_6H_5)_2POCH_2CH_2OP(C_6H_5)_2$; B.P.$_{0.01\ mm.}$ 225–227° C.

To this distillate are added 4 drops of $BrCH_2CH_2Br$ and the solution is heated up to 140° C. After ¼ hour the mixture crystallizes completely. The yield is quantitative. The product is recrystallized from toluene-acetone. Yield 7.5 g. (95%) of

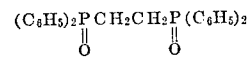

M.P. 256–258.5° C.

*Analysis.*—Calc'd for $C_{26}H_{24}O_2P_2$ (430.4) (percent): C, 72.54; H, 5.62. Found (percent): C, 71.08; H, 5.57.

EXAMPLE 6

A mixture of 11.46 g. (0.05 mole) of

and 5.05 g. (0.0025 mole) of $HO(CH_2)_{12}OH$ is heated in a nitrogen atmosphere at 140° C. for 4 hours. There are evolved 2.2 g. (97.6%) of dimethylamine. To the crude liquid diphosphinite are added some drops of $$BrCH_2CH_2Br$$

and the solution is heated at 140° C. for 8 hours. On cooling the mixture crystallizes. The product is recrystallized from benzene. Yield 13 g. (91%) of

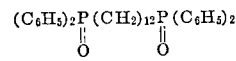

M.P. 165–165.5° C.

*Analysis.*—Calc'd for $C_{36}H_{44}O_2P_2$ (570.68) (percent): C, 75.76; H, 7.77. Found (percent): C, 75.23; H, 8.16.

EXAMPLE 7

A mixture of 4.85 g. (0.03 mole) of

and 1.36 g. (0.015 mole) of $HO(CH_2)_4OH$ is heated at 140° C. in a nitrogen atmosphere for 5 hours. There are evolved 2.1 g. (95.5%) of diethylamine. To the crude distillate are added 2 drops of $BrCH_2CH_2Br$ and heated at 140° C. for one hour. On cooling, the mixture crystallizes. The product is recrystallized from benzene. Yield 3.8 g. (95%) of

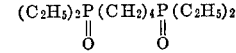

M.P. 112–113° C.

*Analysis.*—Calc'd for $C_{12}H_{28}O_2P_2$ (266.3) (percent): C, 54.11; H, 10.59. Found (percent): C, 53.48; H, 10.83.

EXAMPLE 8

A mixture of 9.7 g. (0.06 mole) of

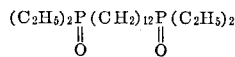

and 6.07 g. (0.03 mole) of HO(CH$_2$)$_{12}$OH is heated in a nitrogen atmosphere at 140° C. for 6½ hours. There are evolved 4.1 g. (93.2%) of diethylamine. To the crude diphosphinite are added 3 drops of BrCH$_2$CH$_2$CH$_2$Br and the solution is heated at 140° C. for 2 hours. On cooling, the mixture crystallizes. The product is recrystallized from benzene. Yield 8 g. (71%) of

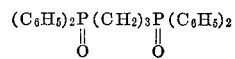

M.P. 96–75.5° C.

*Analysis.*—Calc'd for C$_{20}$H$_{44}$O$_2$P$_2$ (378.5) (percent): C, 63.45; H, 11.72. Found (percent): C, 62.4; H, 11.29.

EXAMPLE 9

A mixture of 22.92 g. (0.1 mole) of (C$_6$H$_5$)$_2$PN(CH$_3$)$_2$ and 3.8 g. (0.05 mole) of HO(CH$_2$)$_3$OH is heated in a nitrogen atmosphere at 140° C. for 6½ hours. There are evolved 4.3 g. (95.5%) of dimethylamine. To the crude diphosphinite are added 2 drops of BrCH$_2$CH$_2$Br and the mixture is heated at 140° C. for 4 hours. The product is fractionally distilled. Yield 15.8 g. (66.5%) of

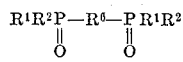

B.P. $_{0.001}$ 280–288° C.; M.P. 195° C.

What I claim is:

1. A process for preparing tertiary phosphine oxides of the formula R$^1$R$^2$R$^3$PO or $$R^1R^2P-R^6-PR^1R^2$$
$$\parallel \quad \quad \parallel$$
$$O \quad \quad O$$

wherein R$^1$ and R$^2$ are each hydrocarbyl groups, R$^3$ is a hydrocarbyl group attached to the phosphorus atom by a primary or secondary aliphatic carbon atom and R$^6$ is a hydrocarbylene group with each phosphorus atom being attached by primary or secondary aliphatic carbon atoms, comprising heating in the presence of an isomerization catalyst an aminophosphine of the formula R$^1$R$^2$PNR$^4$R$^5$ wherein R$^1$ and R$^2$ are as defined hereinabove and NR$^4$R$^5$ represents an amino group derived from ammonia or a primary or secondary amine, with a hydroxyl compound of the formula R$^3$OH or HO—R$^6$—OH wherein R$^3$ and R$^6$ are as defined hereinabove, at a temperature sufficient to split off ammonia or amine and form phosphinite and isomerize the phosphinite to phosphine oxide.

2. A process of claim 1 wherein the reactions are carried out in the presence of an inert atmosphere.

3. A process of claim 1 wherein when an alcohol is a reactant the molar proportion to aminophosphine is about equimolar, whereas, when a diol is a reactant the molar proportion is about 2:1 aminophosphine to diol.

4. A process of claim 1 wherein the reactions are carried out in the range of 100° to 200° C.

5. A process of claim 1 wherein the hydroxyl compound is R$^3$OH, R$^1$ and R$^2$ are straight-chain aliphatic having 1 to 4 carbon atoms, R$^3$ is straight-chain aliphatic having 8 to 24 carbon atoms and the isomerization catalyst is of the formula R$^3$X wherein R$^3$ is as defined hereinabove and X is a chlorine, bromine or iodine atom.

6. A process of claim 1 wherein when an alcohol is a reactant, the isomerization catalyst is R$^3$X with R$^3$ being the same as that of the alcohol and X being a chlorine, bromine or iodine atom and when a diol is a reactant the isomerization catalyst is X—R$^6$—X with R$^6$ being the same as that of the diol and X being a chlorine, bromine or iodine atom.

7. A process of claim 1 wherein the hydroxyl compound is R$^3$OH, R$^1$ and R$^2$ are ethyl, R$^3$ is n-dodecyl, R$^4$ and R$^5$ are methyl, the catalyst is present during the reaction of the alcohol and aminophosphine and the catalyst is R$^3$Br wherein R$^3$ is n-dodecyl, the molar ratio of alcohol to aminophosphine is about 1:1 and the heating is in the range of 100° to 200° C.

8. A process of claim 1 wherein the hydroxyl compound is R$^3$OH, R$^1$ and R$^2$ are methyl, R$^3$ is n-dodecyl, R$^4$ is methyl, R$^5$ is phenyl, the catalyst is present during the reaction of the alcohol and aminophosphine and the catalyst is R$^3$Br wherein R$^3$ is n-dodecyl, the molar ratio of alcohol to aminophosphine is about 1:1 and the heating is in the range of 100° to 200° C.

9. A process of claim 1 wherein the hydroxyl compound is R$^3$OH, R$^1$ and R$^2$ are methyl, R$^3$ is n-tetradecyl, R$^4$ and R$^5$ are ethyl, the catalyst is present during the reaction of the alcohol and aminophosphine and the catalyst is R$^3$Br wherein R$^3$ is n-tetradecyl, the molar ratio of alcohol to aminophosphine is about 1:1 and the heating is in the range of 100° to 200° C.

10. A process of claim 1 wherein the hydroxyl compound is R$^3$OH, R$^1$ and R$^2$ are n-butyl, R$^3$ is 10-undecen-1-yl, R$^4$ and R$^5$ are ethyl, the catalyst is present during the reaction of the alcohol and aminophosphine and the catalyst is n-dodecyl bromide, the molar ratio of alcohol to aminophosphine is about 1:1 and the heating is in the range of about 100° to 200° C.

11. A process of claim 1 wherein the hydroxyl compound is HO—R$^6$—OH, R$^1$ and R$^2$ are phenyl, R$^6$ is CH$_2$CH$_2$, R$^4$ and R$^5$ are methyl, the catalyst is BrCH$_2$CH$_2$Br, the molar ratio of aminophosphine to diol is about 2:1, the heating is in the range of 100° to 200° C. and the reactions are carried out in the presence of an inert atmosphere.

12. A process of claim 1 wherein the hydroxyl compound is HO—R$^6$—OH, R$^1$ and R$^2$ are phenyl, R$^6$ is (CH$_2$)$_{12}$, R$^4$ and R$^5$ are methyl, the catalyst is BrCH$_2$CH$_2$Br, the molar ratio of aminophosphine to diol is about 2:1, the heating is in the range of 100° to 200° C. and the reactions are carried out in the presence of an inert atmosphere.

13. A process of claim 1 wherein the hydroxyl compound is HO—R$^6$—OH, R$^1$ and R$^2$ are ethyl, R$^6$ is (CH$_2$)$_4$, R$^4$ and R$^5$ are ethyl, the catalyst is BrCH$_2$CH$_2$Br, the molar ratio of aminophosphine to diol is about 2:1, the heating is in the range of 100° to 200° C. and the reactions are carried out in the presence of an inert atmosphere.

14. A process of claim 1 wherein the hydroxyl compound is HO—R$^6$—OH, R$^1$ and R$^2$ are ethyl, R$^6$ is (CH$_2$)$_{12}$, R$^4$ and R$^5$ are ethyl, the catalyst is

the molar ratio of aminophosphine to diol is about 2:1, the heating is in the range of 100° to 200° C. and the reactions are carried out in the presence of an inert atmosphere.

15. A process of claim 1 wherein the hydroxyl compound is HO—R$^6$—OH, R$^1$ and R$^2$ are phenyl, R$^6$ is (CH$_2$)$_3$, R$^4$ and R$^5$ are methyl, the catalyst is

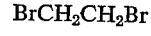

the molar ratio of aminophosphine to diol is about 2:1, the heating is in the range of 100° to 200° C. and the reactions are carried out in the presence of an inert atmosphere.

16. A compound of the formula

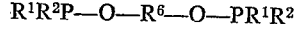

wherein R$^1$ and R$^2$ are each hydrocarbyl groups and R$^6$ is a hydrocarbylene group with each phosphorus atom being attached by primary or secondary aliphatic carbon atoms.

References Cited

UNITED STATES PATENTS 2,642,461  6/1953  Morris et al. _____ 260—606.5
3,304,330  2/1967  Yoke et al. _____ 260—606.5

OTHER REFERENCES

Kosolapoff, Organophosphorus Compounds, (1950), p. 102.

Houben-Weyl, Methoden Organischen Chemie, (1963), p. 209.

Kosolapoff, Chemical Abstracts, vol. 59, (1963), p. 8844d.

TOBIAS E. LEVOW, Primary Examiner

W. F. W. BELLAMY, Assistant Examiner

U.S. Cl. X.R.

260—429, 429.1, 606.5, 962, 999